(12) United States Patent
Tamura et al.

(10) Patent No.: US 9,284,006 B2
(45) Date of Patent: Mar. 15, 2016

(54) STRADDLE TYPE VEHICLE (71) Applicant: HONDA MOTOR CO., LTD., Tokyo (JP)

(72) Inventors: Kenji Tamura, Wako (JP); Hirotaka Onuki, Wako (JP); Kanae Fujitake, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/268,113

(22) Filed: May 2, 2014

(65) Prior Publication Data

US 2014/0367432 A1    Dec. 18, 2014

(30) Foreign Application Priority Data

Jun. 14, 2013    (JP) ................... 2013-126005

(51) Int. Cl.
*B62J 9/00*    (2006.01)
(52) U.S. Cl.
CPC ..................... *B62J 9/001* (2013.01)

(58) Field of Classification Search
CPC .............. B62J 9/00; B62J 9/001; B62J 9/006; B62J 9/005; B62J 9/008
USPC ................... 224/413, 429, 430, 431; 180/219
See application file for complete search history.

(56) References Cited

U.S. PATENT DOCUMENTS 6,520,275 B2 *    2/2003    Galbraith et al. ............. 180/219
8,844,778 B2 *    9/2014    St. Georges ................. 224/413

FOREIGN PATENT DOCUMENTS

JP    3689169 B2    6/2005

* cited by examiner

*Primary Examiner* — Corey Skurdal
(74) *Attorney, Agent, or Firm* — Squire Patton Boggs (US) LLP (57) ABSTRACT

A straddle type vehicle may be provided with a side bag support member in which a horizontal wall part is extended inward in the vehicle width direction from a vertical wall part fixed to a portion of a side bag on the inside in the vehicle width direction to an area below a lower surface part of a rear side cover, and the horizontal wall part is fixed from below to a side bag support part on a lower surface side of a seat frame.

14 Claims, 7 Drawing Sheets

STRADDLE TYPE VEHICLE

BACKGROUND

1. Field

Certain embodiments of the present invention relate to a straddle type vehicle.

2. Description of the Related Art

Heretofore, there has been known a straddle type vehicle in which a case-shaped supporting frame for supporting a side bag (saddle bag) is detachably attached so as to connect a seat frame and a base portion of a pillion step (Japanese Patent No. 3689169).

In recent straddle type vehicles, a body frame is often covered with a body cover to straighten the flow of traveling air or wind. In this case, it may be necessary to form attachment holes, notches or the like in the body cover to attach a support member of a side bag. This causes a problem that the attachment holes, notches, or the like are likely to affect the appearance and the like of the vehicle when the side bag and its support member are detached.

SUMMARY

Accordingly, an object of certain embodiments of the present invention is to minimize the influence of detaching a side bag and its support member from a straddle type vehicle equipped with a detachable side bag.

To solve the above problem, certain embodiments of the present invention relate to a straddle type vehicle. The straddle type vehicle includes a seat on which riders sit. The straddle type vehicle also includes a body frame having a main frame extending from a head pipe to a pivot frame as well as a seat frame extending rearward from the main frame. The straddle type vehicle further includes a rear side cover covering the seat frame from outside. The straddle type vehicle also includes a side bag detachably attached to the outer side of the seat frame, having a side bag support member in which a horizontal support part is extended inward in the vehicle width direction from a vertical support part fixed to a portion of the side bag on the inside in the vehicle width direction to an area below a lower surface part of the rear side cover. The horizontal support part is fixed from below to a side bag support part on a lower surface side of the seat frame.

The straddle type vehicle includes all types of vehicles in which the rider straddles the vehicle body, and not only a motorcycle (including a motorized bicycle and a scooter-type vehicle), but also three-wheeled vehicles (including vehicles two-wheeled at the front and single-wheeled at the rear, as well as those single-wheeled at the front and two-wheeled at the rear), or four-wheeled vehicles.

In other embodiments, the seat frame includes a seat rail extending rearward from an upper portion of the main frame below the seat, and a support frame supporting the seat rail while extending upward to the rear direction from a lower portion of the main frame. The support frame is disposed along an end portion of the lower surface part of the rear side cover on the inside in the vehicle width direction. The side bag support part is provided on a lower surface side of the support frame.

In other embodiments, the side bag support member is an individual component detachable from the side bag, and a fixing member for fixing the side bag to the vertical support part is attached and detached through the inside of the side bag from the outside in the vehicle width direction.

In other embodiments, the side bag support member is formed into an L shape as a whole by extending the horizontal support part inward in the vehicle width direction from a bottom edge of the vertical support part fixed to an upper portion of the side bag.

In other embodiments, the side bag includes a bag-side locking part locked onto a lock part of a step plate supported on the body frame.

In other embodiments, the rear side cover includes a lower surface part covering a lower surface side of the seat frame, and a recess for allowing a fixing part of the horizontal support part of the side bag support member to reach the side bag support part of the seat frame is formed in the lower surface part.

In other embodiments, a straddle type vehicle includes a side bag detachably disposed on the outer side of a body cover covering a body frame. The straddle type vehicle has a side bag support member including a vertical support part fixed to the side bag on the inside in the vehicle width direction, and a horizontal support part extending inward in the vehicle width direction from the vertical support part to an area below a lower surface part of the body cover. The body frame includes a frame member disposed along an end portion of the lower surface part of the body cover on the inside in the vehicle width direction, and a side bag support part provided on the frame member to fix the horizontal support part of the side bag support member from below.

According to certain embodiments of the present invention, the side bag support part of the seat frame (body frame) is positioned close to the end portion of the lower surface part of the rear side cover (body cover) on the inside in the vehicle width direction. With this, the notches and holes for avoiding the side bag support member do not stand out but can be minimized and, thus, influence on the appearance as well as on the traveling air or wind-straightening effect can be minimized.

According to other embodiments, the side bag support part is arranged close to the end portion of the lower surface part of the rear side cover on the inside in the vehicle width direction. Hence, the rear side cover need not largely avoid the side bag support member, so that the side bag support part and the side bag support member can be fixed by a simple structure, the load of the side bag can be supported efficiently by the support frames, and a light and highly rigid support structure can be achieved as a whole.

According to other embodiments, in a case of attaching and detaching the side bag alone while leaving the side bag support member on the vehicle body, the fixing members can be attached and detached from the outside in the vehicle width direction with the side bag in an opened state. Hence, workability can be improved as compared to a case where the fixing members are attached and detached from the lower surface side of the vehicle.

According to other embodiments, since the side bag support member is fixed to the upper portion of the side bag, the side bag can be supported stably. Moreover, since the side bag support member is formed into an L shape as a whole, the periphery of the side bag support part is not covered from the outside in the vehicle width direction. This makes it easier to see the periphery of the side bag support part from the outside in the vehicle width direction when the side bag is detached, so that workability can be improved.

According to other embodiments, since the side bag is supported directly by the step plate, the conventional large support frame for supporting the side bag on the step plate is no longer necessary.

According to other embodiments, since the recesses such as notches and holes are formed in the lower surface part of the rear side cover, the recesses do not stand out, and thus have a smaller influence on the appearance.

DETAILED DESCRIPTION

Hereinafter, certain embodiments of the present invention will be described with reference to the drawings. Directions such as front, rear, left, and right in the following description are the same as directions in a vehicle described below, if not stated otherwise. In the drawings accompanying the following description, an arrow FR indicating the front of the vehicle, an arrow LH indicating the left of the vehicle, and an arrow UP indicating the upper part of the vehicle are used where appropriate.

Figure 1:
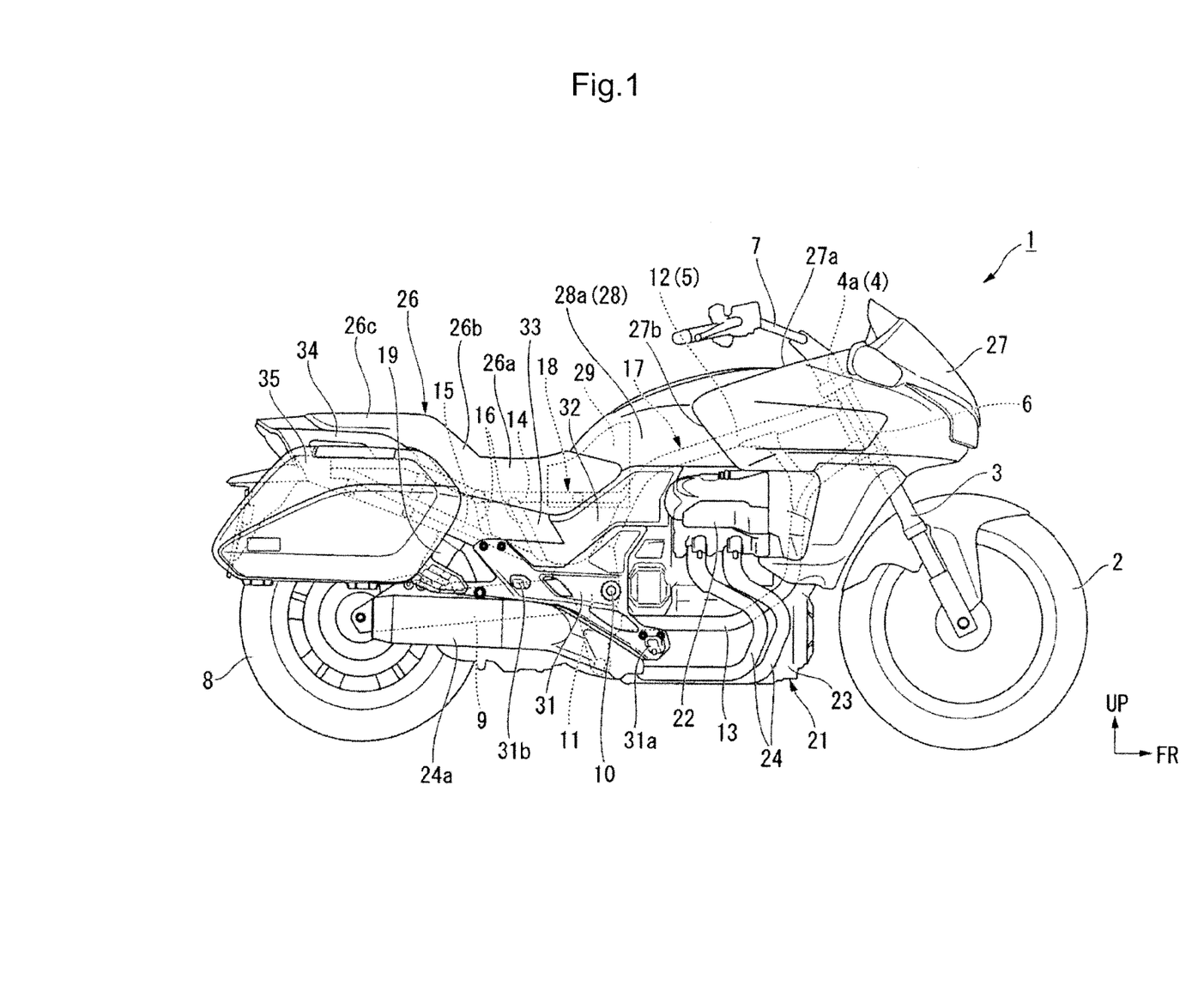
FIG. 1 is a right side view of a motorcycle of an embodiment of the present invention.

In a motorcycle (such as, for example, a straddle type vehicle) 1 shown in FIG. 1, a front wheel 2 thereof is axially supported to bottom end portions of a pair of left and right front fork parts 3. Upper portions of the left and right front fork parts 3 are pivotally supported in a steerable manner by a head pipe 6 provided at a front end portion of a body frame 5, through a steering stem 4. A bar handle 7 for steering the front wheel is attached above a top bridge 4a of the steering stem 4. A rear wheel 8 of the motorcycle 1 is axially supported to rear end portions of swing arms 9.

Front end portions of the swing arms 9 are pivotally supported in a vertically swingable manner by a pair of left and right pivot frames 11 through an unillustrated pivot shaft, the pivot frames 11 being provided in a longitudinally intermediate portion of the body frame 5. Bottom end portions of left and right rear cushions 19 are respectively attached to rear portions of left and right arms of the swing arms 9. Top end portions of the left and right rear cushions 19 are attached to left and right side portions of a seat frame 18 provided in a rear portion of the body frame 5.

The body frame 5 includes a pair of left and right main tubes 12 extending downward to the rear direction from an upper portion of the head pipe 6, curving at an intermediate portion thereof to form a steeper inclination, and extending further downward. The pair of left and right pivot frames 11 have rear bottom end portions of the left and right main tubes 12 connected to the front side of top end portions thereof. The body frame 5 also includes pair of left and right down frames 13 extending downward to the rear direction in a cranked manner from a lower portion of the head pipe 6, thereafter curving rearward, extending substantially horizontally to the rear direction, and having rear end portions thereof connected to the front side of bottom end portions of the left and right pivot frames 11. The body frame 5 further includes a pair of left and right seat rails 14 extending rearward from rear portions of the left and right main tubes 12. The body frame 5 also includes a pair of left and right support frames 15 extending upward to the rear direction from the rear side of upper portions of the left and right pivot frames 11, and connected to rear end portions of the left and right seat rails 14.

Multiple connection pipes 16 are provided to bridge the seat rails 14 and the support frames 15, whereas an unillustrated cross member is provided to bridge the left and right seat rails 14 (particularly between left and right cushion support parts 14a which support top end portions of the left and right rear cushions 19). The left and right seat rails 14, left and right support frames 15, multiple connection pipes 16, and cross member altogether constitute the aforementioned seat frame 18.

Moreover, unillustrated cross members are also appropriately provided to bridge the left and right main tubes 12, the left and right down frames 13, and the left and right pivot frames 11. The left and right main tubes 12, the left and right down frames 13, the left and right pivot frames 11 and cross members, as well as the head pipe altogether form a main frame 17 serving as a front portion of the body frame 5.

An engine unit 21 serving as a motor of the motorcycle 1 is mounted on the main frame 17. The engine unit 21 includes a liquid-cooled four-stroke longitudinal shaped 4 cylinder engine in which the crank shaft is oriented along the longitudinal direction. Exhaust pipes corresponding to the front and rear cylinders stretch out from outer portions of left and right cylinders 22 of the engine unit 21. Each of the exhaust pipes 24 first extends downward to the front direction, then curves back rearward, and then extends and connects with a front end portion of a silencer 24a disposed outside the swing arm 9. An unillustrated transmission is accommodated in a crank case 23 provided in a lower portion of the engine unit 21. An output part of the transmission is coupled in a power-transmittable manner with the rear wheel 8, through components such as a propeller shaft inserted in the right arm of the swing arms 9 and a final gear arranged on the right side of the rear wheel 8.

A front seat 26a and back rest 26b for a rider, and a rear seat 26c displaced upward behind the front seat 26a via the back rest 26b for a rear passenger integrally form a seat 26 supported on the seat frame 18. A top shelter 28 is disposed in front of the seat 26. The top shelter 28 covers the inside of a front cowl 27 in its entire width, and extends rearward while gradually growing narrower in order to form knee grip parts 28a for the rider. A fuel tank 29 is disposed in a part extending from the inside of a rear portion of the top shelter 28 to an area below the front seat 26a. A fuel filler lid 29a is provided in the center of a rear portion of the top shelter 28.

In the drawings, reference numeral 31 denotes a step plate, which is attached so as to spread over a longitudinally intermediate portion and a rear portion of the vehicle, which improves the appearance by covering the left and right pivot frames 11, and which supports a front step 31a for the rider and a rear step 31b for the rear passenger, and the unillustrated pivot shaft (and swing arms 9) can be detached by removing a cap 10.

In addition, in the drawings, reference numeral 32 denotes a center side cover attached above the step plate 31, reference numeral 33 denotes a rear side cover that extends continuously behind the center side cover 32, and reference numeral 27f denotes mirrors on both sides of the front cowl.

A pair of left and right side bags (saddle bags) 35, which are detachably attached to the outer side of rear portions of the seat rails 14 below the rear seat 26c, are disposed on the outer side of the rear side covers 33.

Figure 2:
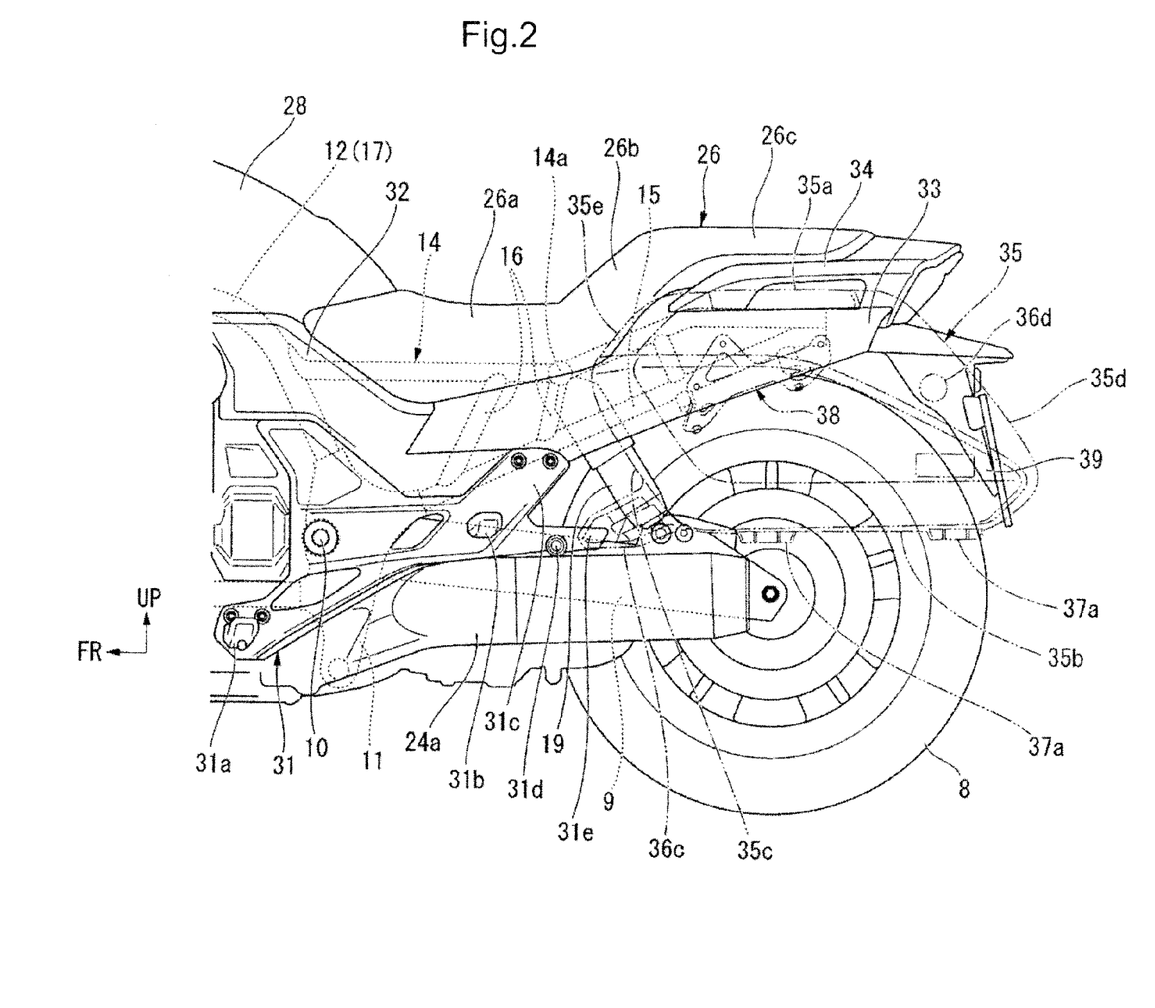
FIG. 2 is a left side view of a rear portion of a vehicle body of the motorcycle.

Also referring to FIG. 2, the side bag 35 is shaped into a rough parallelogram in side view, and includes a top surface part 35a and lower surface part 35b which are substantially horizontal, as well as a front surface part 35c and rear surface part 35d, which are inclined downward to the rear direction. A front top surface part 35e, which is inclined upward to the rear direction in such a manner as to follow the inclination of the back rest 26b of the front seat 26a in side view, is formed on the upper side of the front surface part 35c. A rear upper fastening part 31c fastened to the support frame 15 behind and above the rear step 31b, a silencer support part 31d supporting an upper portion of the silencer 24a behind the rear step 31b, and a bar-shaped rear extension part 31e extending rearward from the silencer support part 31d are provided in a rear portion of the step plate 31.

Figure 3:
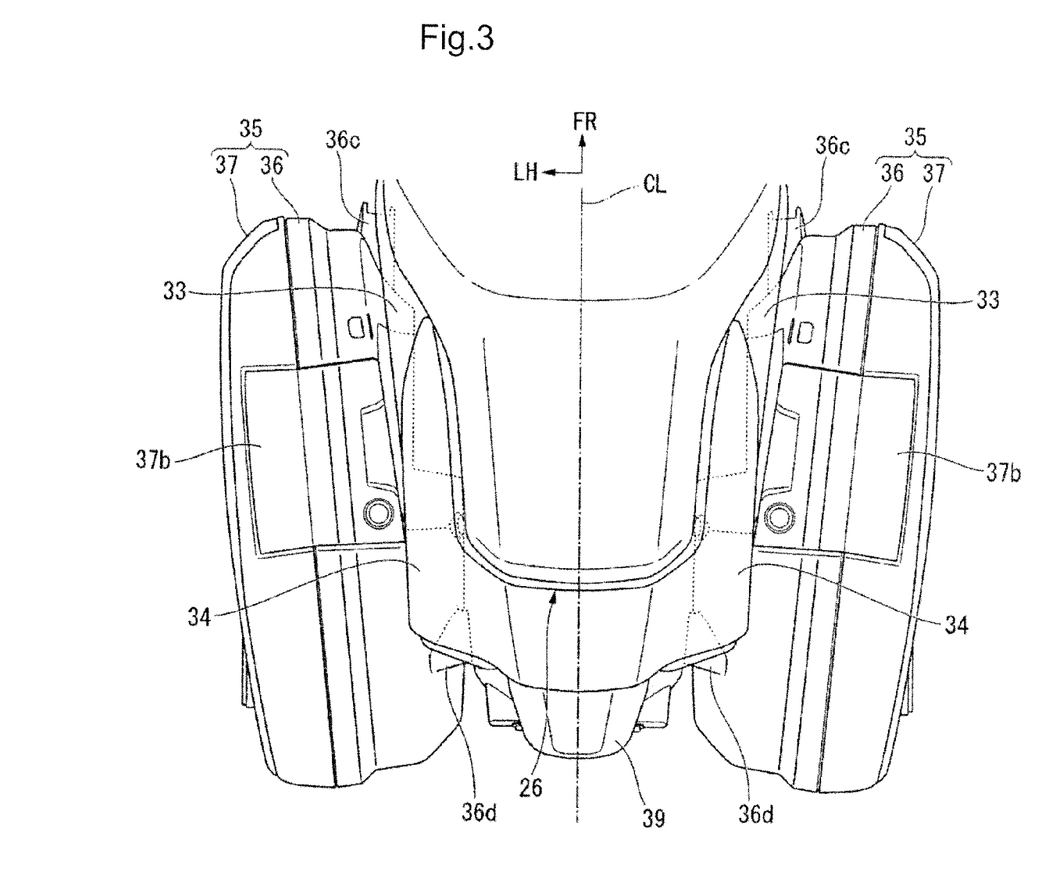
FIG. 3 is a top view around side bags of the motorcycle.
Figure 4:
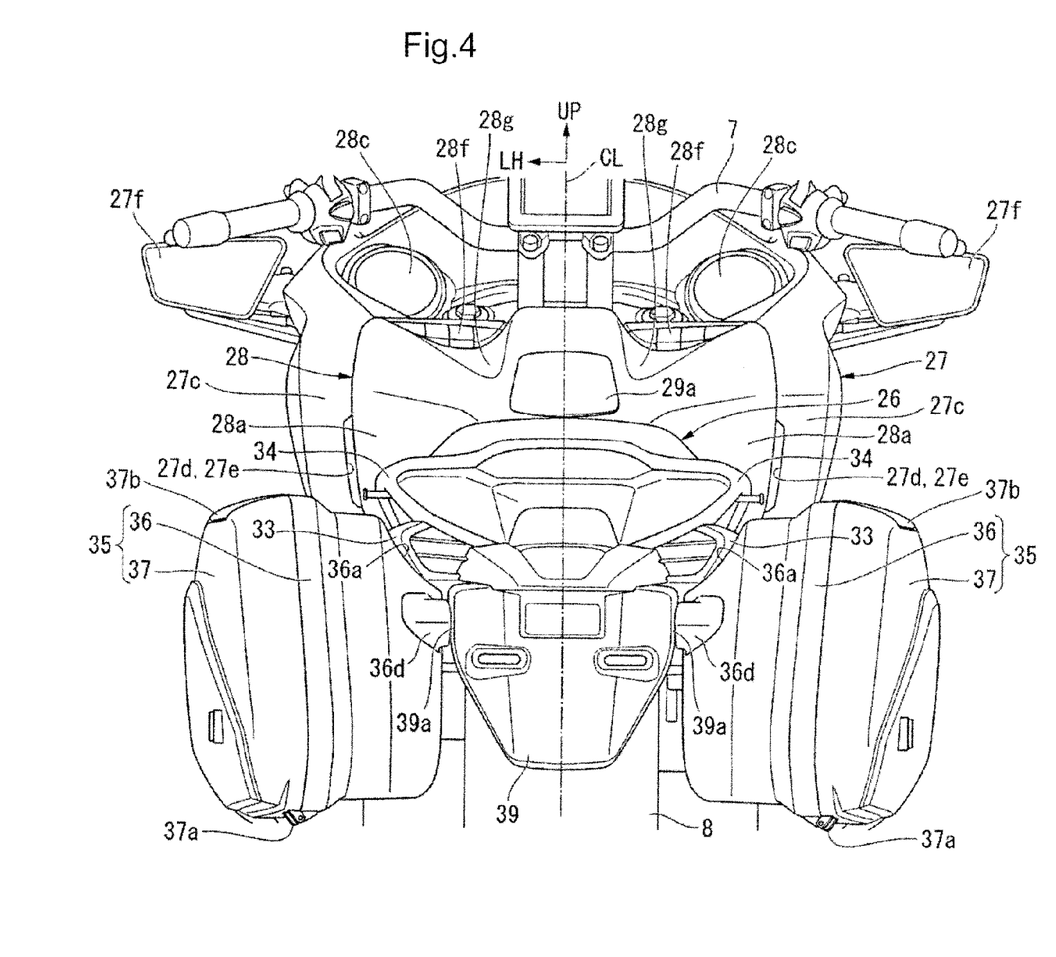
FIG. 4 is a rear view of the motorcycle.

Also referring to FIGS. 3 and 4, the side bag 35 includes a bag main body 36 opened outward in the vehicle width direction, and a lid 37 opened inward in the vehicle width direction. The open ends are brought into contact with each other to form a closed space. The side bag 35 is formed flat with a restrictedly small width in the vehicle width direction, and is disposed in a slightly inclined manner so that in top view, portions positioned closer to the rear are positioned closer to the inside in the vehicle width direction. In the drawings, line CL indicates a centerline in the vehicle width direction.

A portion of the bag main body 36 on the inside in the vehicle width direction is fixed to the body frame 5 (seat frame 18) with a side bag bracket 38.

The lid 37 is openably and closably supported on the bag main body 36 with a pair of front and rear hinges 37a at the lower surface part 35b, and the opening motion can be locked by a flap-shaped lock member 37b at the top surface part 35a.

A depressed part 36a for avoiding the rear side cover 33 is formed on the upper side of the portion of the bag main body 36 on the inside in the vehicle width direction. A bag-side vertical wall part 36b is formed in the depressed part 36a. The bag-side vertical wall part 36b stands up substantially perpendicularly so as to face, in the vehicle width direction, a vertical wall part (vertical support part) 38a of the side bag bracket 38 supported by the seat frame 18, which also stands up substantially perpendicularly. The bag-side vertical wall part 36b is fastened to the vertical wall part 38a of the side bag bracket 38, by a pair of front and rear bolts (fixing members) B1 inserted from the outside in the vehicle width direction (inside the side bag 35), and nuts N1 installed on the vertical wall part 38a of the side bag bracket 38.

A front lower arm part 36c which engages with a rear end portion of the rear extension part 31e of the step plate 31 projects downward to the front direction from the lower side of a front portion of the bag main body 36. The front lower arm part 36c is detachably attached to the rear extension part 31e with an unillustrated elastic member.

A rear projection 36d, which abuts on a side surface part 39a of a rear fender 39, is provided in a projecting manner on a rear portion of the bag main body 36 on the inside in the vehicle width direction. The rear projection 36d abuts on and is supported by the side surface part 39a of the rear fender 39 with an unillustrated elastic member.

The bag main body 36 of the side bag 35 is attached to a rear portion of the vehicle body by having its upper portion supported by the seat frame 18 with the side bag brackets 38. The bag main body 36 is also attached to the rear portion of the vehicle body by having the lower side of its front portion supported by the rear extension part 31e of the step plate 31 with the elastic member. The bag main body 36 is further attached to the rear portion of the vehicle body by having the inner side of its rear portion supported by the side surface part 39a of the rear fender 39 with the elastic member. Meanwhile, the side bag can be easily detached from the vehicle body without using other tools or the like, for example, by opening the lid 37 and taking off the front and rear bolts B1 exposed inside the bag, from the outside in the vehicle width direction.

Figure 5:
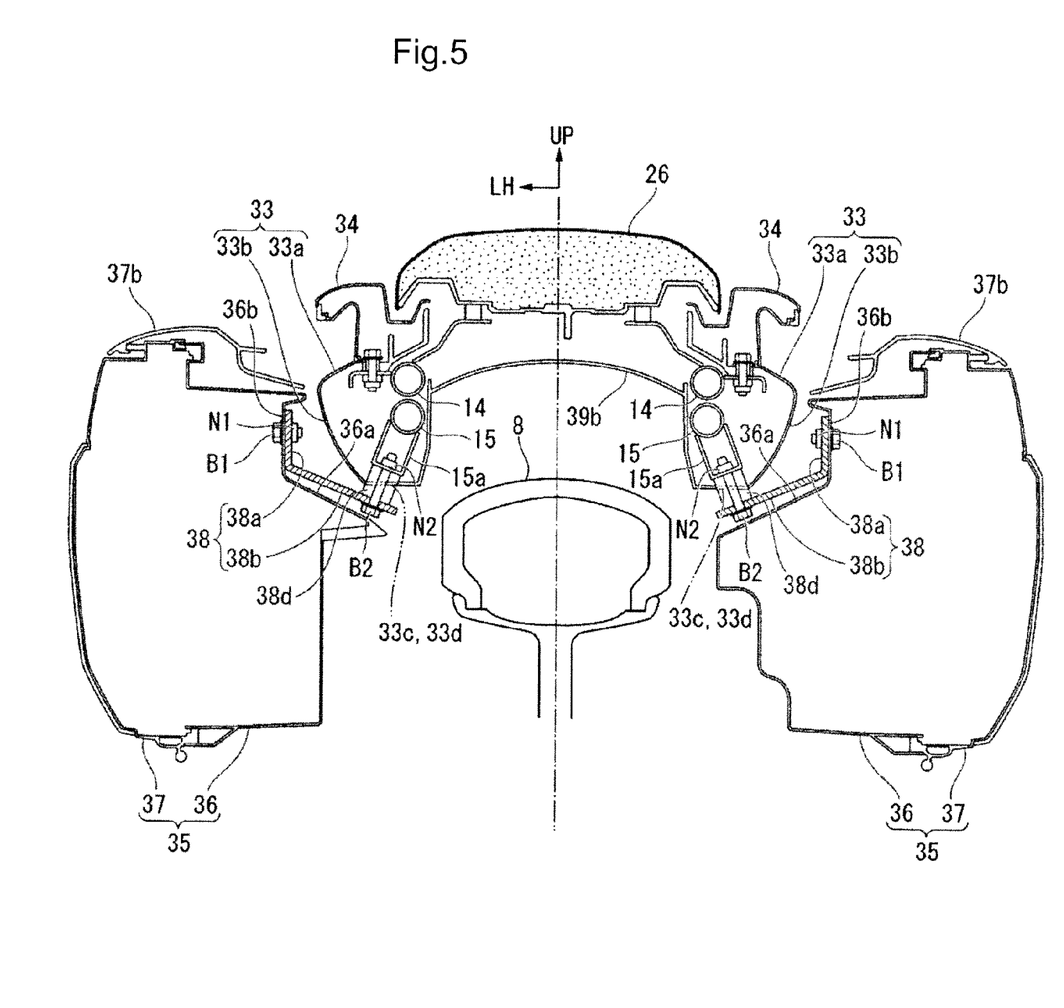
FIG. 5 is a sectional view showing the periphery of parts to which the side bags are attached.
Figure 6:
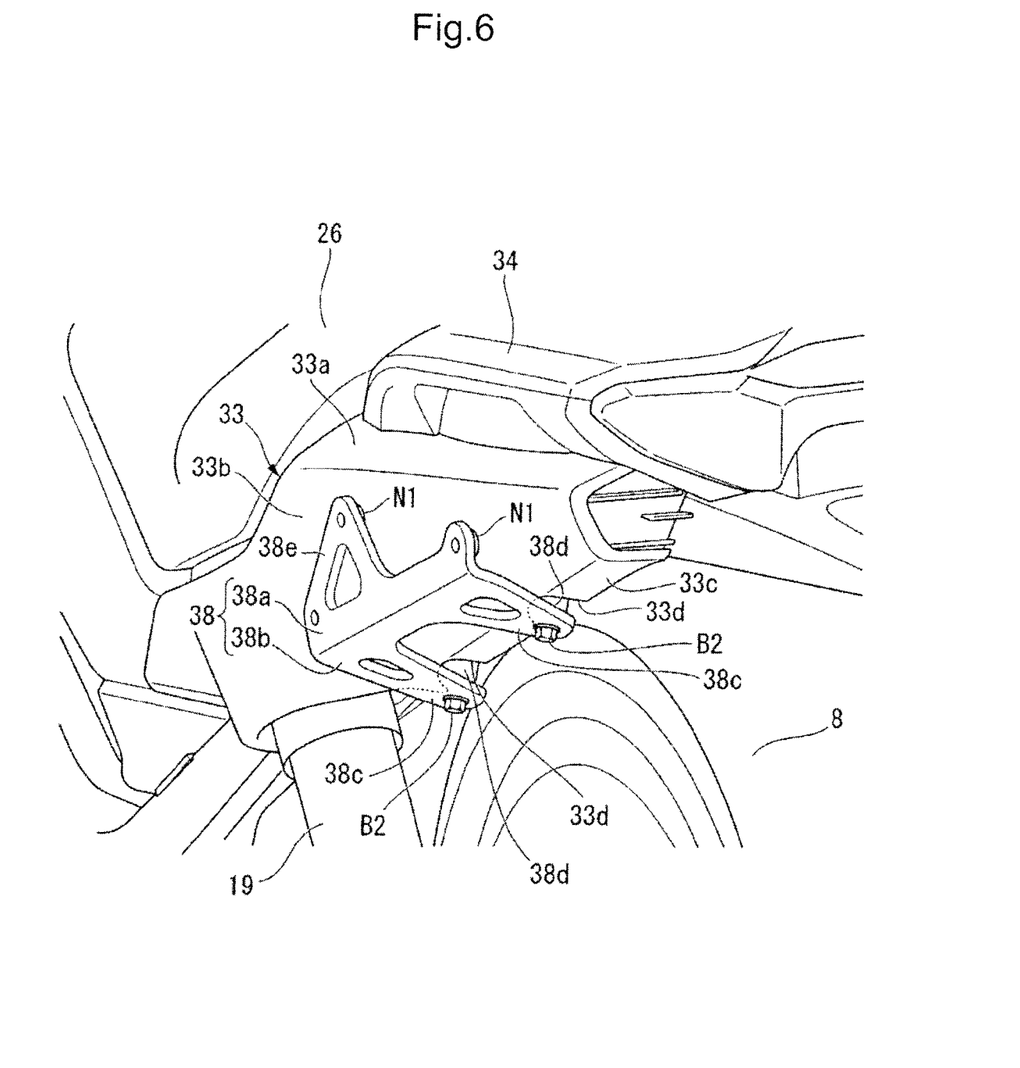
FIG. 6 is a perspective view showing the periphery of a side bag support member on the rear left side of the vehicle body of the motorcycle.

Referring to FIGS. 5 and 6, a part of the rear side cover 33 covering a rear portion of the seat frame 18 includes a top surface part 33a extending from an outer edge of the bottom end of an assist grip 34 disposed thereabove, while inclining in such a manner that portions closer to the outside in the vehicle width direction are positioned lower. The part of the rear side cover 33 covering a rear portion of the seat frame 18 also includes a side surface part 33b extending from an outer edge of the top surface part 33a, while inclining in such a manner that lower portions are positioned closer to the inside in the vehicle width direction. The part of the rear side cover 33 covering a rear portion of the seat frame 18 further includes a lower surface part 33c extending inward in the vehicle width direction in a substantially horizontal manner from the bottom edge of the side surface part 33b. The lower surface part 33c is an end portion of a lower portion of the rear side cover 33 on the inside in the vehicle width direction, and is disposed so as to be inclined upward to the rear direction along the support frame 15, which is positioned above and on the inside of the lower surface part in the vehicle width direction. An inner rear fender 39b is disposed inside the seat frame 18.

Front and rear fastening brackets 15a with nut holes for fastening the side bag bracket 38 formed on the bottom ends thereof, are installed on the lower surface side of a rear portion of the support frame 15.

Here, the side bag bracket 38 integrally includes the vertical wall part 38a. The side bag bracket 38 also includes a horizontal wall part (horizontal support part) 38b extending from a bottom end edge of the vertical wall part and extending while inclining downward and inward in the vehicle width direction. A thick steel plate is bent into an L shape as a whole to form the side bag bracket 38. The horizontal wall part 38b is formed into a gate shape in plan view, which includes front and rear leg parts 38c corresponding to the front and rear fastening brackets 15a. Since the horizontal wall part 38b is inclined upward to the rear direction, the vertical wall part 38a is provided with an upward projection 38e on a front portion thereof, so that the front and rear nuts N1 can be disposed at substantially the same level.

Insertion holes into which front and rear bolts B2 are inserted are formed on the tip end side of the front and rear leg parts 38c, and front and rear bosses 38d into which the front and rear bolts B2 are also inserted are installed on the top surface side of the front and rear leg parts 38c. Top ends of the front and rear bosses 38d are obliquely brought into contact with bottom ends of the front and rear fastening brackets 15a, respectively, from below and from the outside in the vehicle width direction. In this state, the front and rear bolts B2 inserted into the front and rear insertion holes and into the front and rear bosses 38d are screwed and fastened into the respective nuts N2 of the front and rear fastening brackets 15a of the support frame 15, whereby the side bag bracket 38 is fastened to the support pipe from below and from the outside in the vehicle width direction.

Front and rear recesses 33d for avoiding the front and rear bosses 38d of the side bag bracket 38 are formed in the lower surface part 33c of the rear side cover 33. The front and rear recesses 33d are notches, for example, through which the front and rear bosses 38d of the side bag bracket 38 enter the rear side cover 33, and can be fastened to the front and rear fastening brackets 15a of the support frame 15. The front and rear recesses 33d are formed in the lower surface part 33c facing downward in the rear side cover 33 and, thus, are not recognized unless looked up from below. In addition, forming the recesses 33d in the lower surface part has less influence on straightening of the flow of traveling air or wind, as compared to a case where they are formed in the side surface part 33*b* or the like. Moreover, since the side bag bracket 38 is fastened from below and from the outside in the vehicle width direction, the bolts B2 can be attached and detached easier than the case where the side bag bracket is fastened vertically from below. Note that the recesses 33*d* are not limited to the notches, and may be through holes or the like.

Figure 7:
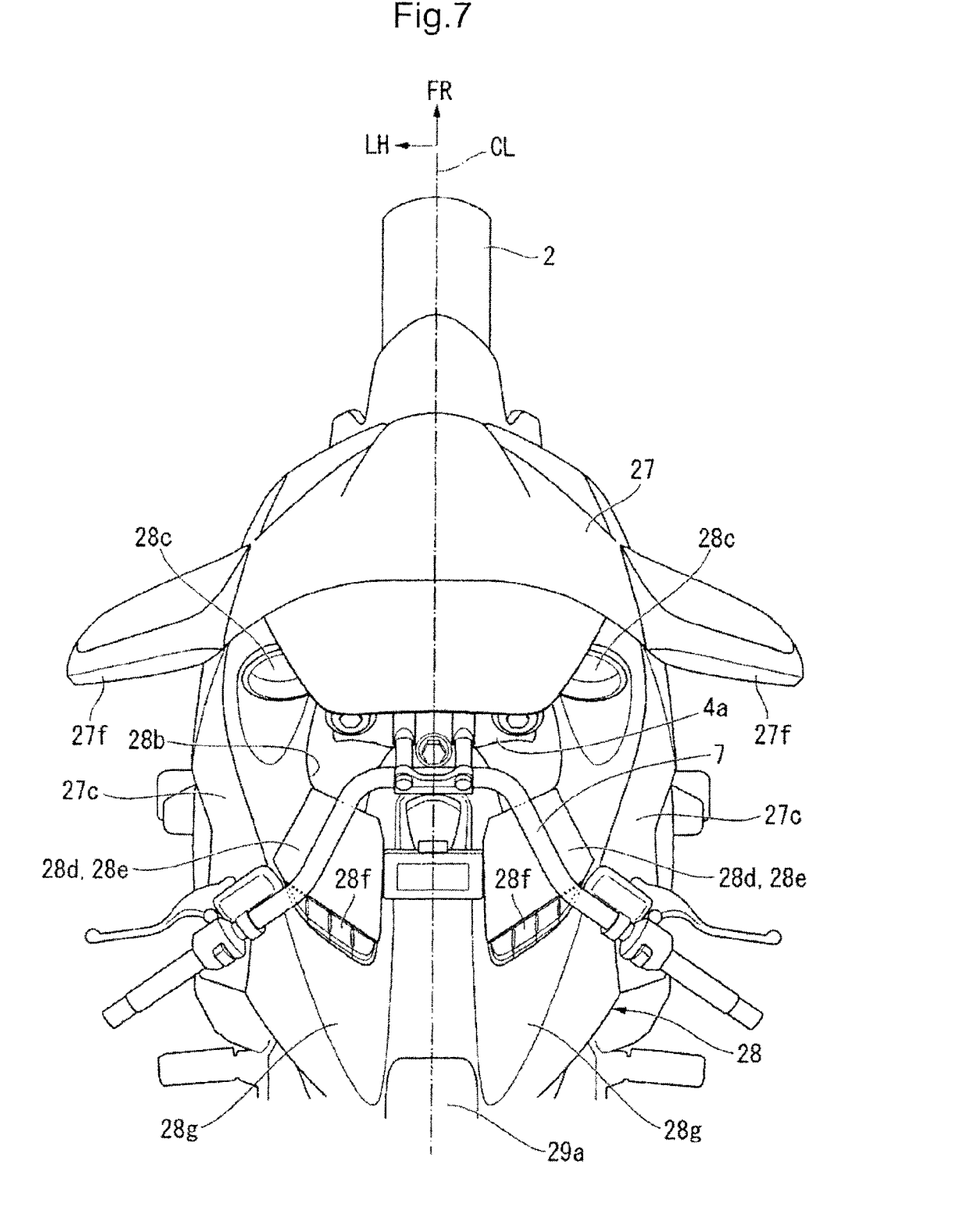
FIG. 7 is a top view of a front portion of the vehicle body of the motorcycle.

Referring to FIGS. 1, 4 and 7, inner walls 27*c* stand up inward in the vehicle width direction from left and right top edge parts 27*a* and down-curved rear edge parts 27*b* of the front cowl 27. While the inner walls 27*c* are connected to left and right edge parts of the top shelter 28, notches 27*d* extending along these left and right edge parts are formed at tip end edges of parts that stand up from the down-curved rear edge parts 27*b* of the inner walls 27*c*. The notches 27*d* form air outlets 27*e* between the inner walls 27*c* and the top shelter 28. The air outlets 27*e* release traveling air or wind introduced into the front cowl 27 from an unillustrated air inlet to areas around the knee grip parts 28*a*.

A front opening 28*b* into which the bar handle 7, the top bridge 4*a* and the like are rotatably inserted is formed in a front portion of the top shelter 28. Left and right speakers 28*c* for on-vehicle audio are disposed on left and right sides of the front opening 28*b*, respectively. Lids 28*e* of left and right storage compartments 28*d* are disposed on left and right sides, respectively, behind the front opening 28*b*. The lid 28*e* opens upward within a limited range so as not to interfere with the steering operation of the bar handle 7.

Left and right operation portions 28*f* for on-vehicle audio are disposed on rear portions of the left and right lids 28*e*. Left and right troughs 28*g* having a downwardly depressed shape and extending with a downward inclination to the rear direction are formed behind the left and right operation portions 28*f*, so that the left and right operation portions 28*f* are a step higher than the top shelter 28 and easier to operate when seen from the rider, and rain or the like can be prevented from being pooled around the left and right operation portions 28*f*.

As has been described, the motorcycle 1 of certain embodiments is a straddle type vehicle equipped with a side bag 35 detachably disposed on the outer side of the body cover (rear side cover 33) covering the body frame 5. The motorcycle 1 includes a side bag bracket 38 having a vertical wall part 38*a* fixed to the side bag 35 on the inside in the vehicle width direction. The motorcycle 1 also includes a horizontal wall part 38*b* extending inward in the vehicle width direction from the vertical wall part 38*a* to an area below the lower surface part 33*c* of the body cover. The body frame 5 includes the frame member (support frame 15) disposed along an end portion of the lower surface part 33*c* of the body cover on the inside in the vehicle width direction. The body frame 5 also includes the fastening bracket 15*a* provided to the frame member to fix the horizontal wall part 38*b* of the side bag bracket 38 from below.

The aforementioned motorcycle 1 is a straddle type vehicle including the seat 26 on which the riders sit. The motorcycle 1 also includes the body frame 5 having the main frame 17 extending from the head pipe 6 to the pivot frames 11, and the seat frame 18 extending rearward from the main frame 17. The motorcycle 1 further includes the rear side cover 33 covering the seat frame 18 from outside. The motorcycle 1 also includes the side bag 35 detachably attached to the outer side of the seat frame 18. The motorcycle 1 also includes the side bag bracket 38 in which the horizontal wall part 38*b* is extended inward in the vehicle width direction from the vertical wall part 38*a* fixed to a portion of the side bag 35 on the inside in the vehicle width direction to an area below the lower surface part 33*c* of the rear side cover 33, and the horizontal wall part 38*b* is fixed from below to the fastening bracket 15*a* on the lower surface side of the seat frame 18.

According to this configuration, the fastening bracket 15*a* of the seat frame 18 (body frame 5) can be positioned close to the end portion of the lower surface part 33*c* of the rear side cover 33 (body cover) on the inside in the vehicle width direction. With this, the notches and holes for avoiding the side bag bracket 38 do not stand out but can be minimized and, thus, influence on the appearance as well as on the traveling air or wind-straightening effect can be minimized.

In the aforementioned motorcycle 1, the seat frame 18 includes the seat rails 14 extending rearward from the upper portion of the main frame 17 below the seat 26, and the support frames 15 supporting the seat rails 14 while extending upward to the rear direction from the lower portion of the main frame 17. The support frame 15 is disposed along the end portion of the lower surface part 33*c* of the rear side cover 33 on the inside in the vehicle width direction, and the fastening bracket 15*a* is provided on a lower surface side of the support frame 15.

According to this configuration, the fastening bracket 15*a* can be arranged close to the end portion of the lower surface part 33*c* of the rear side cover 33 on the inside in the vehicle width direction. Hence, the rear side cover 33 need not largely avoid the side bag bracket 38, so that the fastening bracket 15*a* and the side bag bracket 38 can be fixed by a simple structure, the load of the side bag 35 can be supported efficiently by the support frames 15, and a light and highly rigid support structure can be achieved as a whole.

In the aforementioned motorcycle 1, the side bag bracket 38 is an individual component detachable from the side bag 35, and the fixing members (bolts B1) for fixing the side bag 35 to the vertical wall part 38*a* are attached and detached through the inside of the side bag 35 from the outside in the vehicle width direction.

According to this configuration, in a case of attaching and detaching the side bag 35 alone while leaving the side bag bracket 38 on the vehicle body, the fixing members can be attached and detached from the outside in the vehicle width direction with the side bag 35 in an opened state. Hence, workability can be improved as compared to a case where the fixing members are attached and detached from the bottom side of the vehicle.

In the aforementioned motorcycle 1, the side bag bracket 38 is formed into an L shape as a whole, by extending the horizontal wall part 38*b* inward in the vehicle width direction from the bottom edge of the vertical wall part 38*a* fixed to the upper portion of the side bag 35.

According to this configuration, since the side bag bracket 38 is fixed to the upper portion of the side bag 35, the side bag 35 can be supported stably. Moreover, since the side bag bracket 38 is formed into an L shape as a whole, the periphery of the fastening bracket 15*a* is not covered from the outside in the vehicle width direction. This makes it easier to see the periphery of the fastening bracket 15*a* from the outside in the vehicle width direction when the side bag 35 is detached, so that workability can be improved.

In the aforementioned motorcycle 1, the side bag 35 includes the bag-side locking part (front lower arm part 36*c*), which is locked onto the lock part (rear extension part 31*e*) of the step plate 31 fixed to the body frame 5.

According to this configuration, since the side bag 35 is supported directly by the step plate 31, the conventional large support frame for supporting the side bag 35 on the step plate 31 is no longer necessary.

In the aforementioned motorcycle 1, the rear side cover 33 includes the lower surface part 33c covering a lower surface side of the seat frame 18. Moreover, the recesses 33d for allowing the fixing parts (front and rear bosses 38d) of the horizontal wall part 38b of the side bag bracket 38 to reach the fastening bracket 15a of the seat frame 18 are formed in the lower surface part 33c.

According to this configuration, since the recesses 33d such as notches and holes are formed in the lower surface part 33c of the rear side cover 33, the recesses 33d do not stand out and, thus, have a smaller influence on the appearance.

Certain embodiments of the present invention are not limited to the above embodiments. For example, the straddle type vehicle may include all types of vehicles in which the rider straddles the vehicle body, and not only a motorcycle (including a motorized bicycle and a scooter-type vehicle), but also three-wheeled vehicles (including vehicles two-wheeled at the front and single-wheeled at the rear, as well as those single-wheeled at the front and two-wheeled at the rear), or four-wheeled vehicles.

The engine unit to be mounted may include a horizontally opposed engine, a transverse engine in which the crank shaft is oriented along the vehicle width direction, or the like, and may be a swing unit type.

Various fixing members may be used instead of the bolts and nuts, as fixing members for fixing the side bag 35 to the side bag bracket 38, and for fixing the side bag bracket 38 to the vehicle body.

In the seat 26, at least one of the back rest 26b and the front and rear seats 26a, 26c may be provided as an individual component.

Certain embodiments of the present invention are not limited to the side bag 35 disposed on both sides of the rear portion of the vehicle body, but is applicable to a straddle type vehicle equipped with a side bag on any side portion on any of front and rear positions of the vehicle body.

Moreover, various modifications such as replacing the components of the above embodiments with known components may be made without departing from the gist of the invention.

DESCRIPTION OF REFERENCE NUMERALS 1 motorcycle (straddle type vehicle)
5 body frame
6 head pipe
11 pivot frame
14 seat rail
15 support frame (frame member)
15a fastening bracket (side bag support part)
17 main frame
18 seat frame
26 seat
31 step plate
31e rear extension part (lock part)
33 rear side cover (body cover)
33c lower surface part
33d recess
35 side bag
36c front lower arm part (bag-side locking part)
38 side bag bracket (side bag support member)
38a vertical wall part (vertical support part)
38b horizontal wall part (horizontal support part)
38d boss (fixing part)
B1 bolt (fixing member)

We claim:

1. A straddle type vehicle, comprising:
a seat configured to support a rider;
a body frame having a main frame extending from a head pipe to a pivot frame as well as a seat frame extending rearward from the main frame;
a rear side cover covering said seat frame;
a side bag detachably attached to an outer side of said seat frame; and
a side bag support member comprising a horizontal support part extending inward in a vehicle width direction from a vertical support part fixed to a portion of said side bag on an inside in the vehicle width direction to an area below a lower surface part of said rear side cover,
wherein the horizontal support part is fixed, between a depressed part of said side bag and said lower surface part of said rear side cover, to a side bag support part on a lower surface side of said seat frame.

2. The straddle type vehicle according to claim 1, wherein said seat frame comprises a seat rail extending rearward from an upper portion of said main frame below said seat, and a support frame supporting said seat rail while extending upward to the rear direction from a lower portion of said main frame,
wherein said support frame is disposed along an end portion of the lower surface part of said rear side cover on the inside in the vehicle width direction, and
wherein said side bag support part is disposed on a lower surface side of said support frame.

3. The straddle type vehicle according to claim 1, wherein said side bag support member is an individual component configured to be detachable from said side bag, said straddle type vehicle further comprising
a fixing member configured to fix said side bag to said vertical support part is also configured to be attached and detached through the inside of said side bag from the outside in the vehicle width direction.

4. The straddle type vehicle according to claim 1, wherein said side bag support member is formed into an L shape as a whole by extending said horizontal support part inward in the vehicle width direction from a bottom edge of said vertical support part fixed to an upper portion of said side bag.

5. The straddle type vehicle according to claim 1, wherein said side bag comprises a bag-side locking part locked onto a lock part of a step plate supported on said body frame.

6. A straddle type vehicle, comprising:
a seat configured to support a rider;
a body frame having a main frame extending from a head pipe to a pivot frame as well as a seat frame extending rearward from the main frame;
a rear side cover covering said seat frame;
a side bag detachably attached to an outer side of said seat frame; and
a side bag support member comprising a horizontal support part extending inward in a vehicle width direction from a vertical support part fixed to a portion of said side bag on an inside in the vehicle width direction to an area below a lower surface part of said rear side cover,
wherein the horizontal support part is fixed from below to a side bag support part on a lower surface side of said seat frame, and
wherein said rear side cover comprises a lower surface part covering a lower surface side of said seat frame, and a recess configured to allow a fixing part of the horizontal support part of said side bag support member to reach the side bag support part of said seat frame is formed in the lower surface part.

7. A straddle type vehicle, comprising:
a side bag detachably disposed on an outer side of a body cover covering a body frame; and
a side bag support member comprising a vertical support part fixed to said side bag on an inside in a vehicle width direction, and a horizontal support part extending inward in the vehicle width direction from said vertical support part to an area below a lower surface part of said body cover,
wherein said body frame comprises a frame member disposed along an end portion of the lower surface part of said body cover on the inside in the vehicle width direction, and a side bag support part disposed on said frame member to fix the horizontal support part of said side bag support member between a depressed part of said side bag and said lower surface part of said body cover.

8. A straddle type vehicle, comprising:
seat means for seating riders;
body frame means for supporting the straddle type vehicle, said body frame means having a main frame extending from a head pipe to a pivot frame as well as a seat frame extending rearward from the main frame;
rear side cover means for covering said seat frame;
side bag means for holding objects, said side bag means configured to be detachably attached to an outer side of said seat frame; and
side bag support member means for supporting said side bag means, the side bag support member means comprising a horizontal support part extending inward in a vehicle width direction from a vertical support part fixed to a portion of said side bag means on an inside in the vehicle width direction to an area below a lower surface part of said rear side cover,
wherein the horizontal support part is fixed, between a depressed part of said side bag and said lower surface part of said rear side cover, to a side bag support part on a lower surface side of said seat frame.

9. The straddle type vehicle according to claim 8,
wherein said seat frame comprises a seat rail extending rearward from an upper portion of said main frame below said seat, and a support frame supporting said seat rail while extending upward to the rear direction from a lower portion of said main frame,
wherein said support frame is disposed along an end portion of the lower surface part of said rear side cover on the inside in the vehicle width direction, and
wherein said side bag support part is disposed on a lower surface side of said support frame.

10. The straddle type vehicle according to claim 8,
wherein said side bag support member means is an individual component configured to be detachable from said side bag means, said straddle type vehicle further comprising
a fixing member configured to fix said side bag to said vertical support part is also configured to be attached and detached through the inside of said side bag from the outside in the vehicle width direction.

11. The straddle type vehicle according to claim 8,
wherein said side bag support member means is formed into an L shape as a whole by extending said horizontal support part inward in the vehicle width direction from a bottom edge of said vertical support part fixed to an upper portion of said side bag means.

12. The straddle type vehicle according to claim 8,
wherein said side bag means comprises a bag-side locking part locked onto a lock part of a step plate supported on said body frame means.

13. A straddle type vehicle, comprising:
seat means for seating riders;
body frame means for supporting the straddle type vehicle, said body frame means having a main frame extending from a head pipe to a pivot frame as well as a seat frame extending rearward from the main frame;
rear side cover means for covering said seat frame;
side bag means for holding objects, said side bag means configured to be detachably attached to an outer side of said seat frame; and
side bag support member means for supporting said side bag means, the side bag support member means comprising a horizontal support part extending inward in a vehicle width direction from a vertical support part fixed to a portion of said side bag means on an inside in the vehicle width direction to an area below a lower surface part of said rear side cover,
wherein the horizontal support part is fixed from below to a side bag support part on a lower surface side of said seat frame, and
wherein said rear side cover means comprises a lower surface part covering a lower surface side of said seat frame, and a recess configured to allow a fixing part of the horizontal support part of said side bag support member means to reach the side bag support part of said seat frame is formed in the lower surface part.

14. A straddle type vehicle, comprising:
side bag means for holding objects, said side bag means detachably disposed on an outer side of a body cover covering a body frame; and
side bag support member means for supporting said side bag means, said side bag support member means comprising a vertical support part fixed to said side bag on an inside in a vehicle width direction, and a horizontal support part extending inward in the vehicle width direction from said vertical support part to an area below a lower surface part of said body cover,
wherein said body frame comprises a frame member disposed along an end portion of the lower surface part of said body cover on the inside in the vehicle width direction, and a side bag support part disposed on said frame member to fix the horizontal support part of said side bag support member means between a depressed part of said side bag means and said lower surface part of said body cover.

* * * * *